W. F. HUDSON.
PROPULSION CONNECTION FOR MOTOR VEHICLES.
APPLICATION FILED JAN. 29, 1920.
1,358,079.
Patented Nov. 9, 1920.
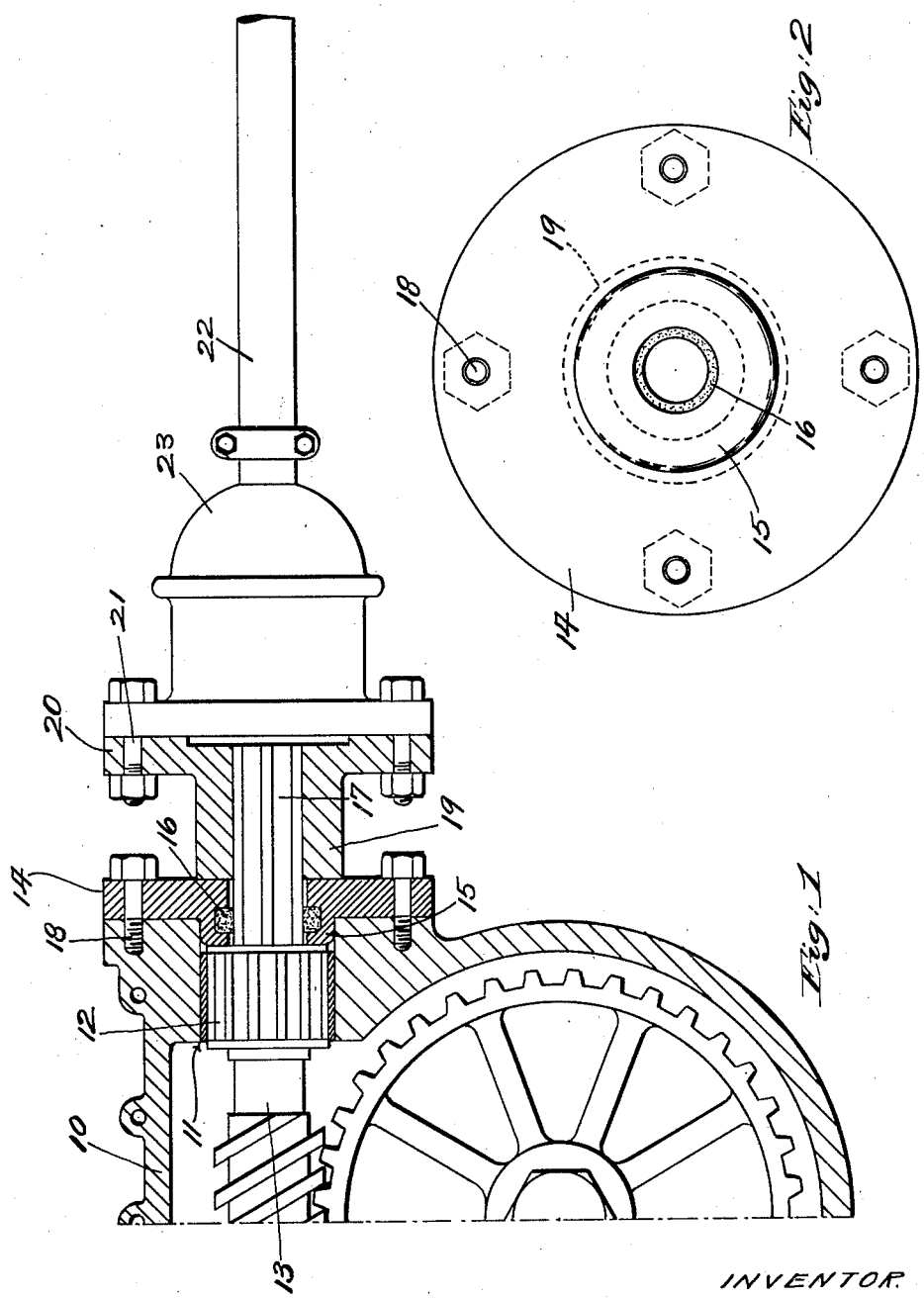
INVENTOR.
William F. Hudson.
BY William J. Jardin
ATTORNEY.

UNITED STATES PATENT OFFICE.

WILLIAM F. HUDSON, OF PHILADELPHIA, PENNSYLVANIA, ASSIGNOR TO HUDSON MOTOR SPECIALTIES COMPANY, A CORPORATION OF PENNSYLVANIA.

PROPULSION CONNECTION FOR MOTOR-VEHICLES.

1,358,079.  Specification of Letters Patent.  Patented Nov. 9, 1920.

Original application filed May 10, 1919, Serial No. 297,425. Divided and this application filed January 29, 1920. Serial No. 354,907.

*To all whom it may concern:*

Be it known that I, WILLIAM F. HUDSON, a citizen of the United States, residing at the city of Philadelphia, in the county of Philadelphia and State of Pennsylvania, have invented a certain new and useful Improved Propulsion Connection for Motor-Vehicles, of which the following is a specification, the same being a division of my application for Letters Patent, Serial No. 297,425, filed May 10, 1919.

This invention, generally stated, relates to motor-vehicle constructions and has more particular relation to means for securing propulsion means with respect to the worm-drive of a truck. It is customary in the construction of worm-driven trucks of certain models, to couple the power transmission direct to the worm-shaft by means of a propeller shaft rigidly connected fore and aft and rigid throughout its length. Such propeller is contained within a casing which is bolted at one end to the housing or casing containing the worm-drive and is bolted at its other end to the transmission casing. Consequently the entire connection between the transmission and the worm-drive possesses no flexibility. Rigidity of connection is very undesirable for various reasons. As an illustration:—In backing a truck for loading or unloading purposes the rear wheels thereof frequently come in contact with a curb or the like and the jar or jolt resulting from such impact is referred to various portions of truck mechanism, causing disalinement, stress, strains and frequently breakage of parts.

It may be said to be a leading object of the present invention to provide a propulsion connection possessed of such flexibility that jars and jolts as may be referred from the rear axle are absorbed by the propulsion means without detrimental effect to the vehicle mechanism. Another object is that of utilizing the worm drive and its casing as manufactured and connecting with respect thereto comparatively few and simple elements for attaining the results recited by the leading object whereby unskilled labor may readily effect a substitution of parts. Other and further objects relate to the provision of flexible propulsion means connected in a new and novel manner with a worm-drive in which connection is combined efficiency, practicability and comparative cheapness with the end in view of commercially bettering truck construction.

The invention consists of the improvements hereinafter described and finally claimed.

The nature, characteristic features and scope of the invention will be more fully understood from the following description taken in connection with the accompanying drawings forming part hereof, and in which:—

Figure 1, is a view in side elevation, partly sectioned, illustrating a connection of worm-drive and propulsion means embodying features of the present invention, and Fig. 2, is an end view of certain of the parts shown in Fig. 1 detached.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In practising the present invention I first disconnect from between the worm-drive housing and the transmission casing of a commercial vehicle, of certain model, the propeller shaft casing and then disconnect the propeller shaft from between the worm-shaft and the power transmission. This propeller shaft is of the rigidly connected type and has splined-joint relation with the worm-shaft. With such propeller shaft and its casing removed there is left protruding from the worm-drive housing 10, the splined end of the worm-shaft. It is this projecting end of the worm-shaft with which the removed propeller shaft has splined-joint relation.

Fitted within the apertured portion 11 of the worm-drive housing 10 is a roller bearing 12 in which is rotatably mounted the worm-shaft 13. Such bearing is calculated to support or sustain the improved propulsion connection of the present invention without resort to additional bearings. In order to prevent dust and dirt gaining access to the bearing 12 and to prevent egress of lubricant from the worm-drive housing a guard is employed. Such guard comprises a disk-like plate 14 having an annular flanged portion 15 upon its inner face and having a central aperture extended through said plate including said flanged portion. The central aperture is preferably provided with an annular groove in which is fitted a ring or washer 16 of felt or equivalent material. The apertured portion of the guard is fitted over the splined end 17 of the worm-shaft and the guard fixed to the housing 10 as by bolts 18. In practice the same bolts are employed for this purpose as were previously used for securing the before mentioned propeller casing to the housing 10. It is to be noted that the flanged portion 15 of the guard engages within the apertured portion 11 of the housing 10 so that a tight joint is effected between the inner face of the guard and the outer face of the housing. Over that part of the worm-shaft which projects beyond the guard is fitted the elongated sleeve 19 which projects from a disk-like plate 20. The sleeve is interiorly grooved for coöperatively engaging with the splines of the worm-shaft so that the two parts may rotate in unison. The end of sleeve 19 abuts against the outer face of the disk-like plate 14. The propelling means is clamped to disk-like plate 20 as by bolts 21. The propelling means may comprise a propeller shaft 22 provided with a universal joint 23.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

What I claim is:

In a construction of the character stated a worm and its complemental shaft, a housing therefor through which projects an end of said shaft, a bearing for said shaft mounted in said housing, a dust guard comprising a disk-like plate having a ring of pliable material therein said plate being fitted over said shaft in abutting relation with the end of said housing, means for clamping said plate to said housing, a second disk-like plate provided with a sleeve, said sleeve co-actively engaging over the major portion of the projected end of said shaft and abutting against the first mentioned disk-like plate, propulsion means and means for clamping said propulsion means to the last mentioned disk-like plate.

In testimony whereof, I have hereunto signed my name.

WILLIAM F. HUDSON.